United States Patent
Schmitt et al.

(10) Patent No.: US 7,119,302 B2
(45) Date of Patent: Oct. 10, 2006

(54) SHORT-TIME ARC WELDING SYSTEM AND METHOD FOR SHORT-TIME ARC WELDING

(75) Inventors: Klaus G. Schmitt, Giessen (DE); Arne Friedrich, Wettenberg (DE)

(73) Assignee: Newfrey LLC, Newark, DE (US)

( * ) Notice: Subject to any disclaimer, the term of this patent is extended or adjusted under 35 U.S.C. 154(b) by 250 days.

(21) Appl. No.: 10/769,722

(22) Filed: Jan. 30, 2004

(65) Prior Publication Data
US 2004/0245221 A1     Dec. 9, 2004

Related U.S. Application Data

(63) Continuation of application No. PCT/EP02/08568, filed on Aug. 1, 2002.

(30) Foreign Application Priority Data
Aug. 2, 2001     (DE) ................. 101 38 947

(51) Int. Cl.
*B23K 9/20*     (2006.01)
(52) U.S. Cl. .......................... 219/99; 219/98
(58) Field of Classification Search ............ 219/98, 219/99
See application file for complete search history.

(56) References Cited

U.S. PATENT DOCUMENTS 5,252,802 A * 10/1993 Raycher ................. 219/98
6,011,234 A * 1/2000 Kirchner et al. ......... 219/98
6,215,085 B1   4/2001 Cummings et al.

FOREIGN PATENT DOCUMENTS

| DE | 43 14 528 A | 11/1994 |
|----|-------------|---------|
| DE | 43 24 223 A | 1/1995  |
| DE | 200 03 127 U | 6/2000 |
| DE | 100 07 838 A | 8/2001 |
| EP | 0 488 518 A | 6/1992  |
| WO | WO 96 05015 A | 2/1966 |

OTHER PUBLICATIONS

PCT/EP02/08568 International Search Report, Dec. 12, 2002, 34 pages.

* cited by examiner

*Primary Examiner*—Clifford C. Shaw
(74) *Attorney, Agent, or Firm*—Harness, Dickey & Pierce, P.L.C.

(57) ABSTRACT

A short-cycle arc-welding system (10) and a method for welding elements (32), such as metal bolts (32) to components (34) such as sheet metal (34) includes a robot (12), having at least one arm (16) displaceable on at least two co-ordinate axes (x, y, z), a welding head base (20) fixed to robot arm (16), a welding head (22) displaceably mounted on welding head base (20), a retaining device (30) retaining an element, a lifting device (36) for setting and re-positioning retaining device (30) in relation to welding head (22), and a measuring system (44,46) determining the relative position between component (34) and element (32). Measuring system (44,46) has a control device (46), controlling lifting device (36) such that element (32) displaces towards component (34) until contacting component (34) to determine the relative position.

27 Claims, 3 Drawing Sheets

SHORT-TIME ARC WELDING SYSTEM AND METHOD FOR SHORT-TIME ARC WELDING

CROSS-REFERENCE TO RELATED APPLICATIONS

This application is a continuation of PCT/EP02/08568, filed Aug. 1, 2002, which claims priority to German application 101 38 947.7, filed Aug. 2, 2001. The disclosures of the above applications are incorporated herein by reference.

BACKGROUND AND SUMMARY OF THE INVENTION

The present invention relates to a short-time arc welding system for welding elements, such as, for example metal studs, onto components, such as, for example metal sheets, with:
  a robot, having at least one arm movable in at least two coordinate axes,
  a welding head base fixed to the robot arm,
  a welding head, mounted movably on the welding head base, on which a holding device for holding an element and a lifting device for advancing and returning the holding device relative to the welding head are provided, and
  a measuring system for determining the relative position between a component and an element to be welded onto the component.

The invention further relates to a method for short-time arc welding, in particular for stud welding, of elements, such as, for example metal studs, onto components, such as, for example metal sheets. A short-time arc welding system of this kind and an associated method are generally known.

With short-time arc welding an element is welded onto a component. An arc is therein formed between element and component, which melts the end faces. Then the element and the component are moved towards one another, so the molten masses are mixed. The arc is short-circuited and the combined molten mass solidified.

It is usual to draw the arc. The element is therein first placed onto the component. Then a pilot current is switched on and the element is lifted with respect to the component up to a desired height, wherein an arc is drawn. Only after this is the welding current connected.

In order to achieve consistently good welding results, it is important to know, inter alia, the relative position between element and component, in particular to lift the element to the right height, before the welding current is connected. For this purpose the relative position is usually measured before each welding process, in particular in the form of determining a zero position.

This is of particular significance with robot-based systems. Though modern robots are generally capable of positioning comparatively accurately, it is not possible to achieve great precision with very high dynamics, in particular owing to the large masses moved.

Stud welding systems are used in particular in the automotive industry. There they serve, above all, to weld elements such as studs with and without thread, eyes, nuts, etc., onto the vehicle body panel. These elements then serve as holding anchors to fix, for example interior fittings.

In the automotive industry manufacturing speed is what really matters. Within a few minutes hundreds of elements have to be welded on at different positions automatically by means of robots. The robots therefore have to be moved with high dynamics.

It is therefore known to attach to the arm of a robot a welding head base, which bears a cradle. The cradle can be moved with high dynamics with great precision, usually by means of a pneumatic or hydraulic system. On the cradle is mounted the actual welding head, which again has a lifting device for moving the element.

From DE 41 208 11 A1 a stud welding device is known, which uses a screw thread reluctance motor (SGRM) as linear motor for axially adjusting a stud holder. For this purpose the moved member of the SGRM forms an adjusting member, the movement of which is transmitted to the stud holder. The non-moved member forms the holder of the stud welding device. The SGRM allows the axial movement forwards and backwards of the stud holder to be controlled in a defined manner with respect to the setting position and speed.

In the position of rest the moved member rests against a stop connected to the holder under the tension of a spring. Only by triggering the SGRM is the moved member displaced out of the position of rest towards the workpiece which is to be provided with a welding stud. The stud holder therein takes up an intermediate position according to a predetermined path before the welding stud impacts on the workpiece, whereby by making contact the welding arc is struck in the known manner.

U.S. Pat. No. 5,252,802 discloses a further stud welding device with a housing, constructed as a hand pistol. A positioning motor first brings the housing into a position in which a stud is arranged near a component. In the housing a linear motor is provided, to move axially a lifting shank, which carries the stud. A path-measuring system is provided for controlling the linear motor. To determine the relative position between stud and workpiece the linear motor is triggered to move the stud at a certain speed towards the workpiece. As soon as the stud touches the workpiece an electrical contact closes.

It is further known from WO 96/11767 to bias the stud holder elastically towards the workpiece and by means of a linear motor to move it axially against the bias.

For detecting the relative position between stud and workpiece it is also known (for example from "Neue TUCKER Technologie. Bolzenschweißen mit System", Emhart Tucker, September 1999) to determine a zero position by means of a support foot.

Finally WO96/05015 discloses a stud welding device without support foot in which an entire welding head can be adjusted by means of an adjustment drive. A holding device holding a stud is provided on the welding head. An adjustment device serves to displace the holding device axially with respect to the welding head. The adjustment device can be a servo-pneumatic or a servo-hydraulic operating cylinder. The relative position between holding device and welding head is detected by means of a path measuring system.

For determining a zero position between stud and workpiece the welding head is moved towards the workpiece until it reaches an end position. In the course of this movement the stud impacts on the workpiece. As the stud from this time can no longer follow the movement of the welding head, from then on the holding device is displaced with respect to the welding head against the pressing movement. This displacement is measured by the path-measuring system and the end position of the welding head thus exactly detected.

Against the above background an object of the present invention is to cite an improved short-time arc welding system and method for short-time arc welding with which high positioning speeds are possible with great precision.

This object is achieved in a first aspect of the invention by a short-time arc welding system, as mentioned initially, wherein the measuring system has a control device which triggers the lifting device in such a way that the element is moved towards the component until it contacts the component in order thus to determine the relative position.

The object is further achieved in the first aspect of the invention by a method for short-time arc welding, in particular for stud welding, of elements, such as, for example metal studs, onto components, such as, for example metal sheets, with the steps:

a) triggering a robot with an arm in such a way that a welding head base with a welding head, fixed to the arm, goes into a basic welding position, b) triggering a cradle bearing the welding head on the welding head base or moving a component in relation to the welding head base in such a way that the welding head goes into a head welding position, c) triggering a lifting device of the welding head in such a way that a holding device with an element held thereon is moved towards the component, and d) detecting the position of the lifting device in which the element contacts the component.

According to a second aspect of the invention the object is achieved by a short-time arc welding system for welding elements, such as, for example metal studs, onto components, such as, for example metal sheets, with a welding head, on which a holding device for holding an element and a lifting device for advancing and returning the holding device relative to the welding head are provided, and a measuring system for determining the relative position between a component and an element to be welded onto the component, wherein the measuring system has a control device which triggers the lifting device in such a way that the element is moved towards the component until it contacts the component, in order thus to determine the relative position, and wherein the welding head has elastic means to bias the holding device elastically into a positioning direction.

The above object is fully achieved by the first aspect of the invention. By means of the combination of a robot and a welding head, fixed movably on the robot arm via a welding head base, high positioning speeds can be achieved with great precision. By the measure of designing the measuring system for determining the relative position between component and element in such a way that in particular no support foot is necessary, the speed can be further increased. This further has the advantage that the component is not contacted by any auxiliary means. In this respect damage of the component in the surrounding region of the welding is ruled out.

In a particularly preferred embodiment the robot arm can be moved in three coordinate axes. Robots of this kind are of particular advantage in the use of welding metal elements on to body panels of motor vehicles. For, in this field of use there is a requirement for welding the studs onto the body panel at any number of places and consequently in the most varied positions.

It is further of advantage if the welding head base has a cradle on which the welding head is mounted. A cradle, or generally speaking a device for carrying out a movement along an axis, is of advantage in so far as highly dynamic movements can be achieved therewith with comparatively great precision. It is therein particularly preferred if the cradle is pneumatically driven. It is herein of advantage that pneumatic power is usually available in the generic short-time arc welding systems as a matter of course.

In a further preferred embodiment the welding head has elastic means to bias the holding device elastically into a positioning direction. By means of this measure the lifting device for advancing and moving back the holding device can in most operating states be held without power. Consequently there is low power consumption.

This feature at the same time forms one of the core features according to the second aspect of the invention. The second aspect of the invention is directed at the design of a welding head, irrespective of whether the welding head is arranged on a robot and/or a welding head base. Decisive in the second aspect of the invention is the combination of a measuring system without a support foot with elastic means for elastic biasing of the holding device into a positioning direction.

With the second aspect of the invention it is consequently advantageous that the relative position between component and element can be measured without the component being touched by auxiliary means. The lifting device used for determining the relative position can further be held in most operating states without power, as the holding device is elastically biased in a positioning direction into a suitable position of rest.

According to a particularly preferred embodiment the elastic means bias the holding device into a return direction. As the lifting device for determining the relative position between component and element is triggered in the advancing direction, the holding device is always located in its elastically biased position of rest in the right starting position, so altogether particularly low energy consumption is achieved. Further, under certain preconditions higher dynamics can be achieved in comparison with other configurations.

In an alternative embodiment the elastic means bias the holding device in the advancing direction. In this embodiment higher dynamics can be achieved in the actual welding process in the advancing direction.

In this embodiment, when using the method according to the invention, it is so that drawing in the holding device during the approach of the welding head into the head welding position takes place against the bias force of the elastic means.

In contrast to this, in the embodiment in which the elastic means bias the holding device in the return direction it is so that the movement of the holding device in method step (c) takes place against the bias force of the elastic means.

Altogether it is preferably so in the method according to the invention that the holding device releases the element after the welding process and the lifting device is switched off, so the holding device is biased by the elastic means into a position of rest.

In the short-time arc welding system according to the invention the measuring system preferably has a path sensor which detects the path of the holding device relative to the welding head.

It goes without saying that the above mentioned features and those still to be described below can be used not only in the combination cited in each case, but also in other combinations or standing alone, without leaving the scope of the present invention.

BRIEF DESCRIPTION OF THE DRAWINGS

Embodiments of the invention are illustrated in the drawings and are explained in greater detail in the following description.

DETAILED DESCRIPTION

Figure 1:
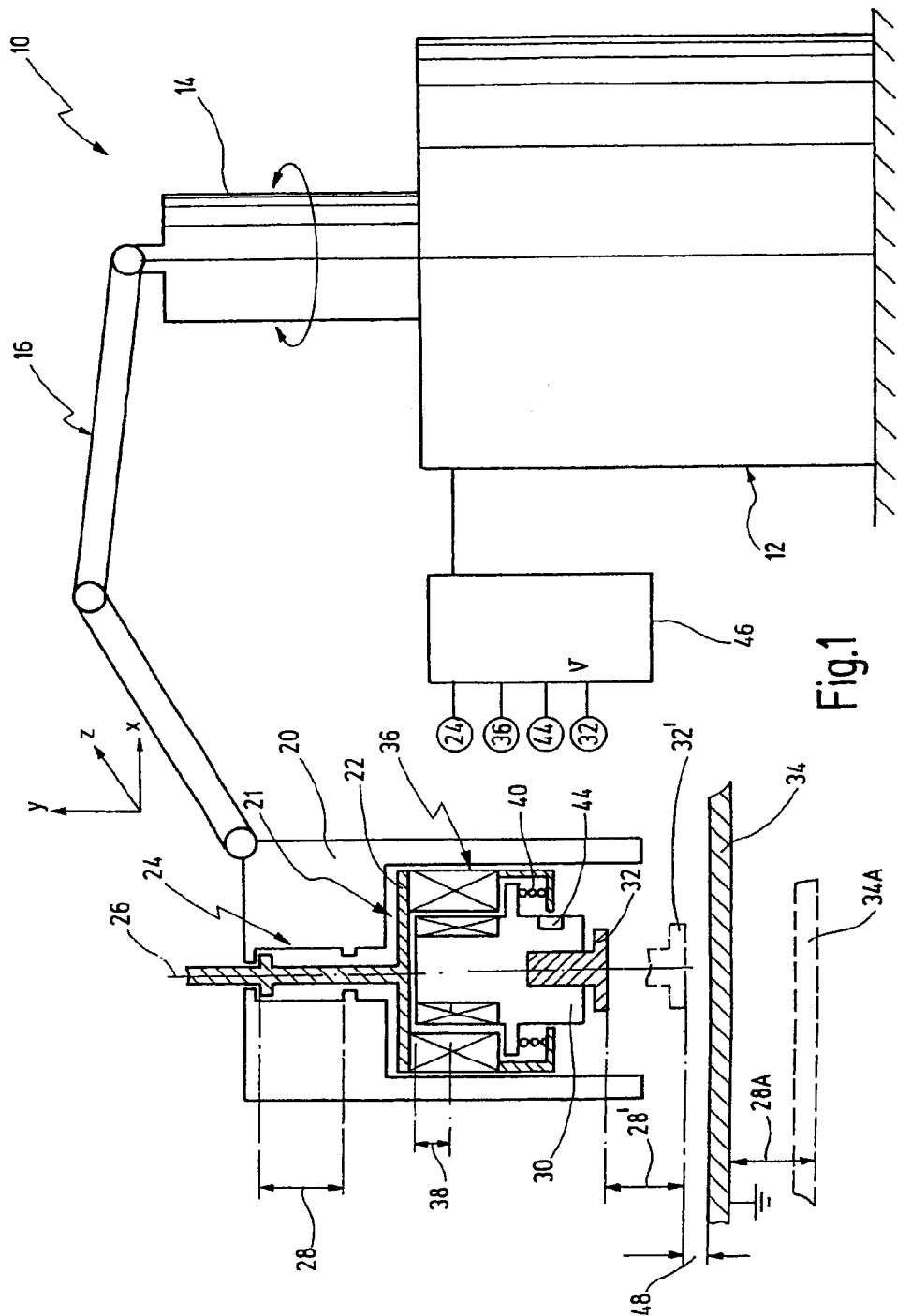
FIG. 1 shows a schematic view of a first embodiment of a short-time arc welding system according to the invention.

In FIG. 1 a first embodiment of a short-time arc welding system according to the invention is generally designated by 10. The short-time arc welding system 10, which is abbreviated below as stud welding system 10, comprises a robot 12. The robot 12 has a rotary head 14, by means of which a singly or multiply articulated arm 16 can be rotated. In all the robot 12 is designed to move the end of the arm freely in three coordinate axes x, y, z.

A welding head base 20 is attached to the end of the robot arm 16. The welding head base 20 carries a cradle 21, which can be moved forwards and backwards relative to the welding head base 20 in the direction of an axis 26. A welding head 22 is mounted on the cradle 21.

A pneumatic arrangement 24 serves to move the welding head 22 forwards and backwards in relation to the welding head base 20 by means of the cradle 21. At 28 the lift of the stroke is shown by which the pneumatic arrangement 24 can move the welding head 22 in relation to the welding head base 20.

The welding head 22 has a holding device 30, which is designed to hold detachably a metal element such as a stud 32. For this purpose the holding device has suitable fixing means, which are not illustrated in greater detail in FIG. 1. FIG. 1 shows a metal component, such as a sheet of metal 34, which is substantially aligned vertically to the axis 26. The welding head 22 further has a lifting device 36, which is formed by a linear motor, in particular an electric linear motor.

The lifting device 36 serves to displace the holding device 30 in relation to the welding head 22 in an axial direction, aligned parallel to the axis 26. The lifting device 36 has a lift of stroke 38 which can be, for example, in the range between 8 mm and 20 mm, in particular in the range between 10 mm and 15 mm. In comparison with this the lift of stroke 28 of the pneumatic arrangement 24 can be in the range between 2 cm and 10 cm, in particular in the range between 4 cm and 6 cm.

Further, the holding device 30 is biased in relation to the welding head 22 in the direction away from the component 34, in other words in the return direction, by means of a pressure spring 40. The pressure spring 40 on the one hand acts on the welding head 22 or the movable part of the cradle 21 and on the other hand on the holding device 30.

The welding head 22 further has a path sensor 44, which in FIG. 1 is indicated only schematically. The path sensor 44 serves to detect the relative position between holding device 30 and welding head 22. For this purpose the path sensor 44 can have a code reader on the holding device 30, which reads a linear coding on the welding head 22.

A control device 46 is further provided. The control device 46 is connected to the robot 12 and to the pneumatic arrangement 24, the lifting device 36 and the path sensor 44. The control device 46 serves to control the movable elements of the stud welding system 10 in coordination with one another or to regulate their movement, speed and/or acceleration on the basis of the signals of the path sensor 44. The control device 46 further serves, as will be described below, to determine the relative position between the element 32 and the component 34 before a welding process.

For this purpose the control device 46 is electrically connected via leads, not illustrated in greater detail, to the stud 32. Further indicated in FIG. 1 is that the control device 46 is capable of applying a measuring voltage V to the stud 32. The component 34 can, for example, be earthed, so via a suitable current measuring device it is possible to detect as soon as the element 32 electrically contacts the component 34.

The operation of the stud welding system of FIG. 1 is explained below using the path-time diagram of FIG. 2. Before a time $T_1$ the robot 12 is triggered in order to bring the welding head base 20 by means of the rotary head 14 and the robot arm 16 into a basic welding position, which is reached at $T_1$. The basic welding position of the welding head base 20 is illustrated in FIG. 1. In this position the welding head base 20 is located at a certain distance above the component 34, wherein the axis 26 stands vertically on the desired welding position of the component 34.

From $T_1$ onwards the pneumatic arrangement 24 is actuated, so the welding head 22 is moved out towards the component 34, and in fact by the full lift of stroke 28, until it reaches the head welding position. The end position of the element 32 is shown in FIG. 1 as 32', in FIG. 2 as $T_2$. The element 32' is therein located at a distance 48 from the component 34 which is smaller than the maximum lift of stroke 38 of the lifting device 36.

From $T_2$ onwards the lifting device 36 is actuated, so the element 32 is moved towards the component 34 until it contacts the component 34 at time $T_3$. This movement preferably takes place at constant speed. The path covered is therein detected by means of the path sensor 44. At time $T_3$ the element 32 contacts the component 34, so a current circuit starting from the measuring voltage V is closed. This is detected by the control device 46 and the lifting device 36 is stopped.

Further, the contact position existing at this time between element 32 and component 34 is brought into play as the "zero position" for the further welding process. Via the path sensor 44 the respective exact relative position between element 32 and component 34 is consequently known over the entire following welding process. The welding process can consequently take place irrespective of any existing tolerances in the positioning by the robot 12 or by the pneumatic arrangement 24 with the desired position relationship between element 32 and component 34. In other words before each welding process there is a "calibration" of the relative position between element 32 and component 34.

From $T_3$ to $T_5$ a stud welding process takes place in a manner known per se. Therein, after cutting off the measuring voltage V, a pilot current is applied to the element 32. Then the element 32 is lifted with respect to the component 34, so an arc is drawn. After a certain height has been reached, the actual welding current is connected, by which the power of the arc is increased in such a way that the end face of the element 32 and the associated place on the component 34 are melted together.

This lifting process takes place only by means of the lifting device 36. The pneumatic arrangement 24 is not actuated herein. Subsequently the lifting device 36 advances the element 32 onto the component again. As soon as the electrical contact has been reached again, at $T_4$, the arc is short-circuited and the welding current is switched off.

Then in general another advancing process takes place to slightly below the surface of the component 34, so good mixing of the mutual molten masses takes place. The combined molten mass solidifies and the actual welding process is complete at time $T_5$. At this time the holding device releases the element 32. The lifting device 36 is further switched off. The holding device 30 is consequently moved back by the spring 40 into the drawn-in position of rest. Further, after this or simultaneously therewith the pneumatic arrangement 24 is triggered by the control device 46 in such a way that the welding head 22 goes back into the drawn-in starting position. At time $T_6$ the stud welding system 10 is again located in the position shown in FIG. 1. Then a new element 32 is supplied to the holding device 30 and the robot 12 is triggered in such a way that the welding head base 20 goes into a suitable basic welding position for the welding process of the new element 32.

Figure 2:
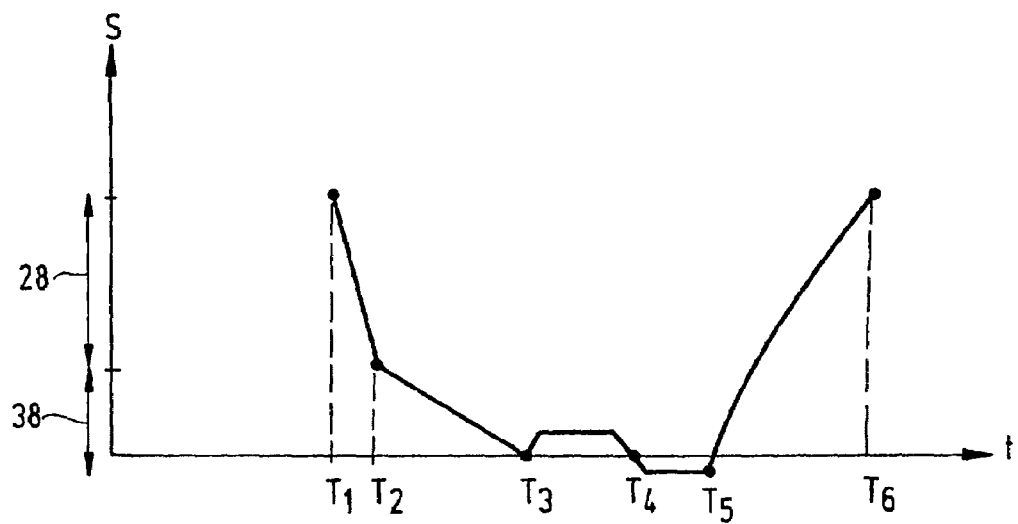
FIG. 2 shows a schematic path-time graph, illustrating the relative position between a component and an element to be welded onto the component (or its holding device) over the time, wherein the position of the component is defined by the time axis; wherein the path-time diagram emerges during operation of the first embodiment of the short-time arc welding system according to the invention according to FIG. 1.

FIG. 2 shows that the course of the path-time graph from $T_1$ to $T_2$ is linear. It is herein assumed that the robot first transfers the welding head base 20 into the basic welding position and then the pneumatic arrangement 24 is actuated. In many cases the movement of the pneumatic arrangement 24 can also be superimposed on the movement of the robot arm 16. In this case a non-linear curve would occur between $T_1$ and $T_2$. For example a non-linear course is shown between $T_5$ and $T_6$. This occurs in that after the holding device 30 has been detached the movements at least of the lifting device 36 and the pneumatic arrangement, optionally also superimpose those of the robot arm 16.

Figure 3:
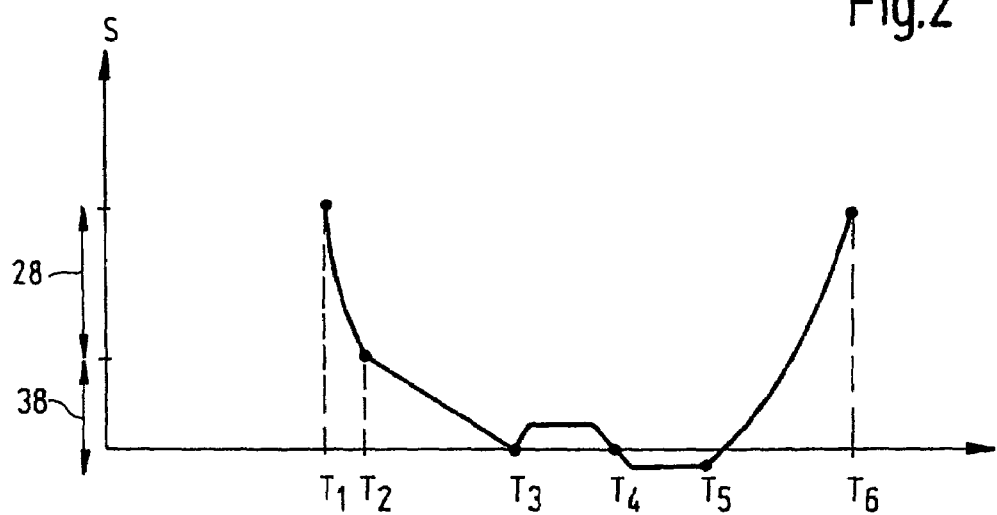
FIG. 3 is a path-time graph, which emerges during operation of an alternative embodiment of a short-time arc welding system, as illustrated schematically in FIG. 4.
Figure 4:
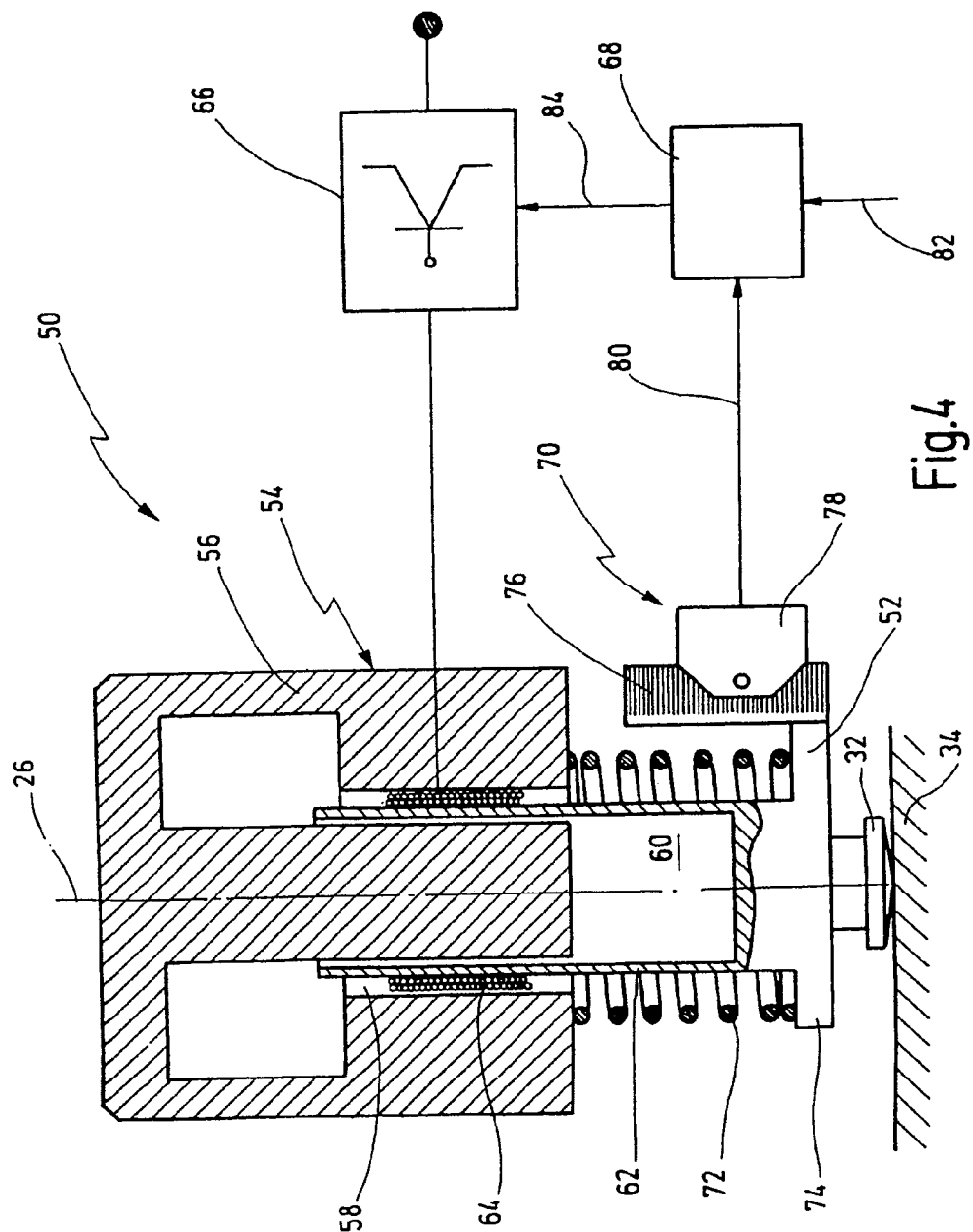
FIG. 4 is a schematic illustration of a welding head of an alternative embodiment of a short-time arc welding system according to the invention.

FIG. 3 shows a similar path-time graph, which differs from the path-time diagram of FIG. 2 in two aspects only. On the one hand the course of the graph between $T_1$ and $T_2$ is shown as a non-linear curve. On the other hand a different non-linear course occurs between $T_5$ and $T_6$ from in the curve of FIG. 2. These differences occur during operation of an alternative embodiment of a stud welding system, the welding head of which is designated in FIG. 4 in general by 50.

Welding head 50 can be mounted instead of welding head 22 on a welding head base 20 by means of a cradle 21. The structure and operation of a stud welding system with welding head 50 can also otherwise be identical to the structure of stud welding system 10 in FIG. 1. Consequently for this second embodiment reference is made to the description of stud welding system 10 and only the differences are explained below.

Welding head 50 has a holding device 52 for an element 32 and a lifting device 54 respectively. The lifting device 54 serves to move the holding device 52 in relation to the welding head 50 in the direction of an axis 26, in order to advance the element 32 onto the component 34 or to return it therefrom. The lifting device 54 has a permanent magnet 56 comprising a circular bore.

The holding device 52 has a blind hole 60 matched to the circular bore 58, so an end of the holding device 52 remote from the component 34 forms a sleeve portion 62, which is inserted into the circular bore 58. On the outer periphery of the sleeve portion 62 a coil 64 is constructed. The coil 64 is connected to a power part 66, which in turn is triggered by a control unit 68, for example by pulse width modulation. Further provided is a path sensor 70, which measures the path of the holding device 52 in relation to the welding head 50.

A pressure spring 72 is arranged between the permanent magnet 56 and a flange 74 of the holding device 52 projecting on the side of the component. The pressure spring 72 biases the holding device 52 into a position of rest and in contrast to the embodiment in FIG. 1 the position of rest is in the advancing direction, so the holding device 52 in the position of rest is drawn out to its maximum with respect to the welding head 50.

By exciting the coil 64 the holding device 52 can be drawn into the welding head 50 with respect to this position of rest against the bias of the pressure spring 72. A code reader 78, rigidly connected to the welding head 50, therein scans a linear coding 76 on the holding device 52. The code reader 78 consequently emits a path actual signal 80 to the control device 68. The control device 68 compares the actual signal 80 with a desired signal 82 and emits a positioning signal 84 to the power part 66. It goes without saying that there is consequently a suitable regulator in the control device 68. Operation of the stud welding system with the alternative welding head 50 is basically identical to operation of the stud welding system 10 of FIG. 1, with the following exceptions: As shown in FIG. 3, in the period between $T_1$ and $T_2$ there occurs a non-linear course of the path of the element 32 over the time. This is because the movement of the pneumatic arrangement 24 is superimposed by a movement of the lifting device 54 into the opposite direction. For during the approach of the welding head 50 to the component 34 the holding device 52 with the element 32 held thereon is first drawn in against the advancing direction and against the force of the spring 72.

In time $T_2$ the holding device 52 is consequently in the fully drawn in position, at its position of maximum distance from the component 34. Further operation between $T_2$ and $T_5$ is identical to the operation of the embodiment of FIGS. 1 and 2.

From time $T_5$ onwards, after the holding device 52 has released the element 32, the movements of the pneumatic arrangement 24 and the holding device 52 takes place by means of the spring 72, which biases the holding device 52 are superimposed into the drawn out position of rest. This movement can be further superimposed by a movement of the robot arm 16.

In both embodiments the element 32 can approach the component 34 highly dynamically and with great precision. Then the combination of control device 46 or 68, path sensor 44 or 70 and lifting device 36 or 54 is used to determine the relative position between element 32 and component 34. Consequently successive welding processes can be carried out with consistently high quality, irrespective of the precision of the positioning of the welding head 22 or 50.

FIG. 1 illustrates another alternative embodiment by a dotted line, in which the component 34A can be adjusted by means of a schematically indicated adjusting device by a stroke 28A. This configuration represents an alternative to the arrangement of a cradle 21 on the welding head base 20. If consequently an adjusting device of this kind for the component 34A is present, it is possible to fix the welding head rigidly to the welding head base 20.

Further, in many cases it can be sufficient to bring the end of the robot arm directly into a position in which the element 32 is in the approximate position designated by 32' in FIG. 1. This applies in particular if the holding device 30 or 52 is biased into a position of rest with respect to the welding head 22 or 50 by means of elastic means, such as the spring 40 or 72.

The above-mentioned range data for the stroke of the pneumatic arrangement 28 (or 28A) and the lifting device 36 or 54 are designed to achieve particularly high dynamics with the greatest possible precision of positioning.

In particular is use in the automotive industry to weld holding anchors such as studs with and without thread, eyes, T-studs, etc., on vehicle bodywork panels, high dynamics of this kind with great precision are of particular importance as part of an automated production line. It is of further advantage in the embodiments illustrated that the component 34 is not touched by other elements of the welding head before, during and after the welding process, but only by the element 32 itself.

What is claimed is:

1. A welding system for welding elements onto components, comprising:
    a welding head including:
        a holding device operative to hold the element; and
        a lifting device operative to advance and return the holding device relative to the welding head; and
    a measuring system operative to determine a relative position of the component to the element, the measuring system including:
        a control device operable to trigger the lifting device to move the element towards the component until the element contacts the component, operatively determining the relative position, and
        an elastically deflectable biasing element operable to bias the holding device in a predetermined direction.

2. The welding system of claim 1, wherein the the predetermined direction comprises a return direction.

3. The welding system of claim 1, wherein the the predetermined direction comprises an advancing direction.

4. The welding system of claim 1, wherein the measuring system comprises a path sensor operable to detect a path of the holding device relative to the welding head.

5. A method for performing short-time arc welding operable to weld an element onto a component, using a holding device, a lifting device, a measuring system and a control device, the method comprising:
    holding the element with the holding device in a rest position;
    translating the lifting device to operatively advance the holding device toward the component;
    triggering the lifting device with the control device to controllably move the element toward the component until the element contacts the component;
    determining a zero position of the lifting device when the element contacts the component using the measuring system;
    performing a welding sequence; and
    elastically biasing the holding device toward the rest position with an elastic biasing element.

6. The method of claim 5, comprising initiating a pilot current through the element to the component.

7. The method of claim 6, comprising withdrawing the lifting device to operably initiate the welding sequence.

8. The method of claim 7, comprising:
    shutting off the pilot current; and
    initiating a welding current.

9. The method of claim 5, comprising detecting a position of the holding device to the welding head using a path sensor.

10. The method of claim 9, comprising reading a linear coding on the holding device using a code reader of the path sensor.

11. The method of claim 5, comprising actuating a pneumatic arrangement prior to the translating step.

12. The method of claim 5, comprising:
    releasing the element following the welding sequence; and
    returning the holding device to the rest position.

13. A method for short-time arc welding, in particular for stud welding an element onto a component, using a robot having an arm, a welding head base connected to the arm, the welding head base having both a welding head a cradle, the cradle operatively securing both a welding head and a lifting device, the method comprising:
    triggering the robot to operatively translate the welding head base to a basic welding position;
    performing one of translating the cradle, and moving the component in relation to the welding head base, to operatively translate the welding head to a head welding position;
    operating the lifting device such that the holding device with the element held therein is operatively moved towards the component;
    detecting a position of the lifting device wherein the element contacts the component; and
    directing at least one directional movement of the welding head using an elastically deflectable biasing element.

14. The method of claim 13, comprising triggering the lifting device to operatively draw the holding device away from the component.

15. The method claim 14, comprising drawing the holding device against a bias force of the elastically deflectable biasing element.

16. The method of claim 13, biasing the holding device during the operating step against a bias force of the elastically deflectable biasing element.

17. The method of claim 13, comprising:
    initiating a welding operation after the detecting step;
    switching off the lifting device; and
    releasing the element from the holding device after completing both the initiating step and the switching step.

18. The method of claim 17, comprising biasing the holding device into a rest position using the elastically deflectable biasing element after the releasing step.

19. A short-time arc welding system operable to weld an element onto a component, comprising:
    a welding head base;
    a welding head axially moveable with respect to the welding head base;
    a holding device operable to hold the element, the holding device slidably disposed with respect to the welding head;
    a displacement device connected to the welding head base, the displacement device operable to each of advance the welding head away from the welding head base and retract the welding head into the welding head base;
    a lifting device connected to the welding head operable in an on condition to one of advance the holding device in a first direction away from the welding head and retract the holding device in a second direction toward the welding head;

a biasing element operable to elastically bias the holding device in the other one of the first and second directions opposite to the operation of the lifting device when the lifting device is in an off condition;

a measuring system operable to determine a relative position between the component and the element; and a control device operable to trigger the lifting device to operatively move the element toward the component until the element contacts the component and thereby determine the relative position.

20. The welding system of claim 19, wherein the biasing element is positioned between the holding device and the cradle to bias the holding device in the first direction when the lifting device is in an off condition.

21. The welding system of claim 19, wherein the biasing element is positioned between the holding device and the lifting device to bias the holding device in the second direction when the lifting device is in an off condition.

22. The welding system of claim 19, comprising a robot having at least one arm movable in at least two coordinate axes.

23. The welding system of claim 22, wherein the welding head base is connected to the arm for movement of the welding head base in three coordinate axes.

24. The welding system of claim 19, further comprising a cradle having the welding head base operably mounted thereon.

25. The welding system of claim 19, wherein the displacement device comprises a pneumatic drive.

26. The welding system of claim 19, wherein the element comprises a metal stud.

27. The welding system of claim 19, wherein the component comprises a metal sheet.

* * * * *